United States Patent [19]

Prent

[11] Patent Number: 5,234,976
[45] Date of Patent: Aug. 10, 1993

[54] HUMAN HEAD MOLD SYSTEM

[76] Inventor: Mark Prent, 35 Bank St., St. Albans, Vt. 05478

[21] Appl. No.: 911,925

[22] Filed: Jul. 10, 1992

[51] Int. Cl.⁵ .......................... C08L 5/04; B29C 33/40
[52] U.S. Cl. ...................................... 524/28; 264/222; 264/223; 264/DIG. 30
[58] Field of Search .................. 524/28; 264/222, 223, 264/DIG. 30

[56] References Cited

U.S. PATENT DOCUMENTS

| | | | |
|---|---|---|---|
| 2,769,794 | 11/1956 | Coler | 260/41 |
| 2,806,008 | 9/1957 | McNulty | 260/17.4 |
| 3,852,083 | 12/1974 | Yang | 106/111 |
| 3,958,997 | 5/1976 | Greenberg | 106/38.5 R |
| 4,260,574 | 4/1981 | Macomson | 264/129 |

Primary Examiner—Paul R. Michl
Assistant Examiner—La Vonda DeWitt
Attorney, Agent, or Firm—Thorpe North & Western

[57] ABSTRACT

A molding material for constructing h of living models comprises a composition of alginate powder, water, and chopped polystyrene. This composition is useable in a method of making one-piece head molds or one-piece hand molds of living models by applying the composition to the head of a model, wrapping the composition-covered head in plaster bandages until the composition has cured, removing the bandages, cutting the cured mold so that the model can be freed from the mold, placing the cut edges of the mold in register, and replacing the plaster bandages.

3 Claims, No Drawings

HUMAN HEAD MOLD SYSTEM

BACKGROUND OF THE INVENTION

This invention relates to an improved molding composition. More particularly, this invention relates to a composition for making one-piece head molds and one-piece hand molds of living models.

Life-size, accurate replicas of body parts are used in a variety of fields, including art, medicine, and education. Materials that have been used for constructing molds for making such replicas suffer a number of drawbacks. For example, the consistency of most molding materials is not firm enough to adhere to vertical surfaces to which they are applied, such as is required in molding a head. These molding materials tend to slough or slide away in a mass from a vertical surface. Also, molding materials are usually not suitable for application directly to the skin because they stick after curing unless a coating of petroleum jelly or other separator is first applied to the skin. Another problem is that after curing, molding materials tend to become very rigid. For making one-piece head molds, a somewhat flexible material is needed to allow removal of the mold from the model without distortion of the mold. Further, the material should be applied as a single layer to make the mold as light as possible and to reduce the time the model must wait for the mold to cure. On the other hand, if the material cures too quickly the artist or technician may not have sufficient time to finish applying the material.

Alginate is a well-known material for making molds or for use in casting a replica. For example, dentists routinely use alginate for making impressions of teeth. As a casting material, alginate mixed with a filler, such as diatomaceous earth, sets to form a jelly-like object which dries to form a rigid object of smaller size that is a miniature of the jelly-like object (U.S. Pat. No. 3,958,997).

Alginate by itself suffers several drawbacks as a molding material for making one-piece head molds. Perhaps the most serious drawback is the difficulty of finding an alginate composition with a consistency that will permit application to vertical surfaces without sliding or sloughing off. Another drawback is that alginate tends to cure rapidly, making it difficult for an artist or technician to apply the material to an entire head in a single layer before it cures. If the alginate does cure before the application is complete, then additional layers may have to be applied to complete coverage, but layers of cured alginate do not adhere together very well and so a multiple layer mold made of alginate is impractical. Layers of alginate may be glued, but this is an inconvenient and time-consuming step. A further difficulty of using alginate alone to make molds is that cured alginate tends to sag and tear, especially when removing the mold from the model. Tears in the mold, of course, result in seam lines in the cast product. These seam lines require additional work to remove them in finishing the product.

OBJECTS AND SUMMARY OF THE INVENTION

It is an object of the present invention to provide a molding material that is suitable for making one-piece head molds and one-piece hand molds of living models.

Another object of the present invention is to provide a molding material that, in its liquid form before curing, is thick enough to be applied to vertical surfaces without it sloughing or sliding off.

Still another object of the present invention is to provide a molding material that does not stick to skin after curing so that no separator need be applied to the model's skin before making the mold.

It is a further object of the present invention to provide a molding material that is firm but flexible after it has cured.

It is also an object of the present invention is to provide a simple and efficient method of constructing one-piece head molds and one-piece hand molds of living models.

These and other objects may be accomplished with a molding material comprised of alginate, polystyrene, and water. More particularly, alginate powder, finely chopped polystyrene, and water are mixed together to a consistency sufficient to permit application to vertical surfaces without appreciable sloughing. The molding composition is then applied to the head or hand of a living model in a single layer, after which the composition is stabilized until it has had time to cure. After the molding composition has cured, the stabilizer is removed and the mold is cut and lifted to free the model from the mold. Finally, the edges of the cut mold are manipulated back into register and the stabilizer is replaced to restore the mold to its shape in readiness for casting.

DETAILED DESCRIPTION OF THE INVENTION

The invention described herein is a composition for constructing one-piece head molds of living models. The proportions of the components may be varied somewhat without affecting the capacity of the composition to function as designed. The preferred formulation contains in parts by volume about 4 parts of alginate powder, about 3 parts of water, and about 2.5 parts of finely chopped polystyrene mixed together in any order. However, the brand of alginate that is used affects the relative proportions of alginate, water, and polystyrene needed to achieve any particular consistency. The relative amounts of the components can be adjusted to achieve the desired consistency. With some brands of alginate and for some applications, equal volumes of the components yield a suitable consistency. Thus, a suitable consistency is found in the ranges of about 1 to 4 parts of alginate powder, about 1 to 4 parts of water, and about 1 to 4 parts of finely chopped polystyrene. For making head molds, the consistency should be thick enough to permit application of the mixture to vertical surfaces of a model's head without appreciable sloughing or sliding off.

The polystyrene component of the composition may be chopped into small particles with a food processor. Both extruded and expanded types of polystyrene are suitable. The polystyrene renders the cured mold stronger and more tear-resistant than molds of alginate alone. Although alginate is flexible, it tears quite easily, and such tearing occurs most often when removing a mold from a model's head.

Inclusion of polystyrene with alginate also lengthens the time for curing of molds over that of alginate alone. But this makes the process of making a head mold shorter and more comfortable for a model, rather than longer. Alginate alone cures rapidly, making it difficult for an artist or technician to completely cover a model's head before curing takes place. If a mold cures before complete coverage of a model's head is accomplished, the artist or technician will have to apply an additional layer or layers until coverage is complete, but layers of alginate do not stick to each other very well. These layers can be glued together, but this is inconvenient and time-consuming. Thus, addition of polystyrene actually makes the mold construction process go faster because complete coverage of a head can be accomplished before the alginate-polystyrene composition cures. This means that only one layer need be applied to a model's head.

The method of making a one-piece head mold begins by mixing alginate powder, water, and finely chopped polystyrene to the desired consistency. Then, the composition is applied to a model's head in a single layer of about 0.25 to 0.5 inch thickness. Next, means of stabilizing the composition until curing has occurred are applied. In the preferred method, plaster bandages are wrapped around the composition to hold it in place. The molding composition is permitted to cure and the plaster bandages or other stabilizing means are removed. Then, the cured mold is cut at the back of the model's head from the neck to the top of the head. The mixture is easily cut with an implement such as a sculptor's spatula. Next, the cut edges of the cut mold are separated and the mold is lifted from the model's head. Some slight back and forth movement may be needed to get the mold to release from around the ears of the model. The cut edges of the mold are then placed back into register and the stabilizing means are replaced. Finally, the mold is ready for casting of a replica of the model's head using traditional media such as plaster or wax.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A method of constructing head molds of living models comprising
    (a) mixing an alginate/polystyrene composition in parts by volume about 1 to 4 parts of alginate powder, about 1 to 4 parts of water, and about 1 to 4 parts of finely chopped polystyrene, such that the composition has a consistency sufficient to permit application to vertical surfaces without appreciable sloughing,
    (b) applying the composition to a model's head in a single layer,
    (c) applying means for stabilizing the composition,
    (d) permitting the composition to cure,
    (e) removing the stabilizing means,
    (f) cutting the cured mold from the back of the neck of the model upwardly along the back of the head to the top of the head,
    (g) separating the edges of the cut mold and lifting the mold to release the model's head,
    (h) manipulating the edges of the cut mold back into register, and
    (i) replacing the stabilizing means.

2. The method according to claim 1 wherein step (a) comprises mixing in parts by volume about 4 parts of alginate powder, about 3 parts of water, and about 2.5 parts of finely chopped polystyrene 3. The method according to claim 1 wherein the stabilizing means are plaster bandages.

* * * * *